Patented June 2, 1953

UNITED STATES PATENT OFFICE 2,640,784

2,640,784
COMPOSITION OF GLASS, ESPECIALLY FOR FIBERS

Ralph L. Tiede, Newark, Ohio, and Fay V. Tooley, Urbana, Ill., assignors to Owens-Corning Fiberglas Corporation, Toledo, Ohio, a corporation of Delaware No Drawing. Application January 21, 1950, Serial No. 139,962

5 Claims. (Cl. 106—50)

The present invention relates to a glass composition which, because of its many highly desirable properties, is advantageously adapted to the formation of glass fibers.

The art of forming glass products is fraught with many problems, not the least by far being the attaining of a workable molten siliceous mass which has properties facilitating the steps of the process to which it is subjected. The shortcomings of such siliceous masses or glasses are peculiarly magnified and accordingly more serious in the art of forming fibers.

As compared to some glass forming operations wherein relatively large amounts of molten glass are molded or cast, in a fiberizing step each minute portion of the molten mass is individually dealt with; each minute portion is expanded into the enormous surface area represented in the volume of a single fine fiber. Consequently, in these cases physical properties of the molten glass are even more important.

Typical of some of the problems met in processing molten glass and of some of the properties desired therein are the following:

1. Devitrification rate

The glass should have a low devitrification rate. This enables various steps of the process to be performed without undue haste under more suitable conditions and consequently performed more efficiently and completely.

In the fiber forming art this property has special import. For example, whatever particular viscosity-temperature relationship a molten glass may have, experience has been that it has a viscosity best suited for fiberizing when the glass is at a temperature dangerously close to its devitrification temperature. Accordingly, it is not uncommon to have the discharge ends of the feeder orifices, through which the streams flow, at a temperature actually below the devitrification temperature of the glass in order to realize this proper glass viscosity.

As fibers are formed from streams of molten glass flowing from such a feeder, they cool and solidify very quickly due mostly to their great surface area per unit volume. Consequently if a glass has a high devitrification rate, it may at this time undergo devitrification, thus interfering both with the efficiency of the process and the quality of the product.

To avoid this, it may be necessary to operate at a temperature higher than that corresponding to the proper viscosity even though this means creating additional technical problems, such as too low a glass viscosity, that such changes in operating conditions entail.

Accordingly, if a glass has a sufficiently low devitrification rate, it may be attenuated into fibers at the proper viscosity-temperature relationship, even though the temperature may be at or below the devitrification temperature of the glass.

2. Viscosity

The glass should have a reasonable low viscosity at temperatures readily attainable.

Again this property has special significance in the fiber forming art. Here a relatively low viscosity advantageously results in a high production rate of fibers. When a glass has a relatively low viscosity it readily flows through the fine orifice openings of a feeder and offers a minimum of resistance to the forces of attenuation in the fiberizing step. In fact, when a glass is quite fluid, the streams issuing from a feeder must practically of necessity be quickly fiberized or otherwise fairly rapidly removed from that vicinity in order to prevent the glass from flooding across the bottom of the glass feeder. This is true whether the glass is fiberized into long continuous filaments by mechanical pulling means or disrupted into discontinuous fibers by a gaseous blast.

3. Liquidus

A glass having a desirable viscosity at low temperatures should also have a low liquidus temperature with respect to the temperature at which it is to be worked. Such a condition increases the probability of uninterrupted production of products of suitable quality. Another direct benefit of this is that it permits the operating temperature of the glass to be correspondingly low, resulting in a saving of time to melt and fine a batch, a saving of fuel costs, a reduction in the intensity of the heat for the operating personnel, and the like.

In the fiber forming art, a glass having a low liquidus together with desirable viscosity at low temperatures provides a further advantage. In many instances precision apparatus used in forming fibers, for example, feeders, come into direct contact with the molten glass. The capacity of molten glass for intense chemical and physical attack is well known. Such attack increased rapidly at high operating temperatures. There are unfortunately few materials which can withstand simultaneous exposure to these temperatures and molten glass and consequently few materials from which such apparatus can be made. Platinum has been employed, but its extremely high cost and lack of ready availability has discouraged its extensive use and thereby retarded the development of the fiber forming art.

However, in a workable glass with an appreciably lower operating temperature as compared to conventional glasses, the corrosive attack is correspondingly lessened in intensity. Non-noble metals which can withstand this exposure may be used in fabricating such apparatus or alloyed noble metals may be used, thereby reducing to a great extent the dependency of the art on the availability of platinum.

4. *Operating range*

The glass should have a comparatively wide operating range. By this term is meant the temperature range in which properties such as viscosity are at desirable values and do not change rapidly throughout the range. Technically with respect to viscosity, a glass having this property may be said to have a "flat" viscosity curve.

A glass having a wide operating range does not require as critical control as other glasses, and its operation is much smoother with attendant advantages in the quality of the products and the like.

5. *Melting rate*

The glass should have a high melting rate. Regardless of the temperature at which a glass is melted, it is highly desirable for it to melt and fine quickly, thereby reducing fuel costs and time required before subsequent steps in processing may be carried out.

6. *Properties*

In addition to those problems and properties previously mentioned which relate to processing glass when molten, there is the problem of realizing a glass product which in the solid state has properties such as suitable strengths, resistance to attack by water and acids, to electrical conductance, to abrasion, and the like, at least to a satisfactory degree.

Again such properties are especially important when the glass is in fiber form because of the high amount of surface area per unit volume.

It is emphasized that while some glasses are known which may possess one or more of the indicated desired properties, no glass is known which possesses them all, that is, one in which each of the desirable properties is combined with the others to produce a highly improved glass.

Therefore, the principal object of this invention is to provide a composition of matter having all of the desirable properties indicated.

For example, objects include providing a siliceous composition having a low devitrification rate, the proper viscosity at low temperature, a low liquid temperature, a wide operating range and other properties whereby the art of processing molten siliceous matter is facilitated and improved, particularly in the production of siliceous fibers, and whereby products result having desirable properties such as resistance to attack by water and acids.

Other objects and advantages are apparent from the following description which merely discloses and illustrates the invention and is not intended to limit the claims.

The invention is a composition of matter comprising basically the following ingredients in substantially the amounts indicated in weight per cent:

|  | Per cent |
|---|---|
| $SiO_2$ | 50 to 62 |
| $TiO_2$ | 5 to 25 |
| $B_2O_3$ | Up to 12 |
| $Na_2O$ | 10 to 20 |

Better glasses are obtained which more completely satisfy the objects of the invention when zirconia is used to replace some of the titania. In this case the titania-zirconia grouping may still comprise 5 to 25% of the whole composition. However, if the zirconia content exceeds 16% of the whole composition, glasses having undesirable viscosities result. It has also been found preferable to keep the titania content below 16% in the titania-zirconia grouping, although this is not essential as in the case of zirconia.

To satisfy the objects in the fullest measure, it is desirable to add two other ingredients in substantially the following weight per cent:

|  | Per cent |
|---|---|
| $Al_2O_3$ | Up to 10 |
| F | Up to 8 |

The presence of alumina lowers the devitrification temperature, while fluorine increases the batch melting rate without harming the durability properties and, in addition, lowers the viscosity. Either one of these ingredients may be added to the basic composition without the other, although preferably both are present.

For example, highly useful glasses having all the ingredients may be selected from the following range of compositions given in weight per cent:

|  | Per cent |
|---|---|
| $SiO_2$ | 50 to 62 |
| $TiO_2$ $ZrO_2$ | 5 to 25 |
| $B_2O_3$ | 2 to 12 |
| $Na_2O$ | 10 to 20 |
| $Al_2O_3$ | 1 to 10 |
| F | 0.5 to 8 | wherein the zirconia does not exceed 16%.

The desirable range of compositions and the preferred composition of the present invention in weight per cent are:

|  | Desirable Range | Preferred Composition |
|---|---|---|
|  | *Percent* | *Percent* |
| $SiO_2$ | 55 to 60 | 57.8 |
| $TiO_2$ | 4 to 12 | 7.7 |
| $ZrO_2$ | 1 to 7 | 3.9 |
| $B_2O_3$ | 5 to 8 | 7.7 |
| $Na_2O$ | 11 to 15 | 14.5 |
| $Al_2O_3$ | 3 to 5 | 4.9 |
| F | 3 to 5 | 3.5 |

Compositions in the desirable range of the invention are found to have better viscosities for production techniques, and the resulting products made therefrom exhibit improved durabilities such as under water and acid attack.

The preferred composition represents as nearly as it is practicable to determine an optimum balance of the desirable properties contributed by each ingredient.

With respect to the allowable ranges indicated, if more silica is used, the viscosity of the glass rises making it more difficult to work. On the other hand, if less than the minimum amount is employed, the durability properties are affected adversely.

If less than approximately 5% is employed of either titania when used along or of titania and zirconia when used together, the chemical durability and/or resistance to devitrification of the glass are adversely affected. As the content of titania alone or the titania-zirconia grouping rises over 25%, there is a general increasing loss of the desirable properties.

An increase of boric oxide and sodium oxide over their indicated maximum amounts results in a loss of durability to attack by water and acid. If the sodium oxide content is below about 10%, the viscosity of the glass increases. An amount greater than about 10% alumina increases the liquidus temperature to an undesirable degree.

As stated, the presence of fluorine is found to increase the melting rate and decrease the viscosity of the glass. However, an amount in excess of approximately 8% does not appear to increase the advantages but instead tends to create a health hazard because of the fumes and volatiles rising from the surface of the hot molten glass.

In practice, fluorine may be added to the batch in chemical combination with one or more of the elements also found in the composition of the present glass. For example, fluorine may be added in the form of sodium aluminum fluoride (cryolite), sodium silico-fluoride, sodium fluoride, aluminum fluoride, and the like.

The glass of the present invention is highly resistant to devitrification. No crystals were found in samples held for six hours at temperatures between 1300° F. and 1650° F. in a typical glass in the range of compositions having a liquidus temperature of 1630° F.

Further, the glass has a relatively low viscosity at a given temperature as compared to other conventional commercial glasses. In one case, the viscosity of this glass matches that of a glass heretofore used for forming fibers at a temperature 255° F. lower. This lower viscosity of the present glass is reflected in an appreciable increase in fiber production as, for example, when used in a method such as is disclosed in Patent No. 2,481,543 to Stalego. The liquidus temperature of the preferred composition is appreciably below those found in conventional glasses, for instance, about 1650° F. as compared to 2000° F. to 2100° F.

The operating range of the present glass is of the order of 200° F. Particularly when the present glass is used in the method disclosed in the cited Stalego patent, this property enables the fibers to remain stable in the burner flame during attenuation even though they are heated rapidly. The glass also melts and fines quickly. A small melting section measuring only six by seven inches in width and length melted 19 pounds of the present glass every hour at an operating melting temperature of 2650° F. The physical properties of the glass, such as resistance to attack by water and acids, suitable strengths and the like, are further substantially as good as those found in other glass and in some cases even better.

While a glass made in accordance with the present invention may be formed, if desired, into the usual pressed, blown, cast, rolled or extruded objects commonly found in the art, it finds chief application in the manufacture of fibers by such methods as, for example, are disclosed in the cited patent to Stalego and in Patent No. 2,133,236 to Slayter and Thomas.

By such methods, the glass is attenuated into many fine fibers which may be associated in a helter-skelter fashion and bonded at their junctures such as by a resin of the phenol aldehyde type. The mats or bats of fibers so formed find wide application as insulation.

It is also possible to draw such glass into continuous filaments by means of a spool running at high speeds as disclosed in Patent No. 2,234,986 to Slayter and Thomas.

Glass fibers produced by the above methods may also be successfully fabricated into strands, twisted yarns, ply yarns, and then interwoven, knitted, or braided in various textiles, such as fabrics as disclosed, for example, in Patent No. 2,133,238 to Slayter and Thomas.

Various modifications and changes may be made in the present invention within the spirit and scope of the appended claims.

We claim:

1. Siliceous matter consisting by weight of:

| | Per cent |
|---|---|
| $SiO_2$ | 50 to 62 |
| $TiO_2$ | 2.5 to 16 |
| $ZrO_2$ | 2.5 to 16 |
| $B_2O_3$ | Up to 12 |
| $Na_2O$ | 10 to 20 |
| $Al_2O_3$ | Up to 10 |
| F | 0.5 to 8 | wherein the sum of the titania and zirconia does not exceed 25%.

2. Glass having substantially the following composition by weight:

| | Per cent |
|---|---|
| $SiO_2$ | 55 to 60 |
| $TiO_2$ | 4 to 12 |
| $ZrO_2$ | 1 to 7 |
| $B_2O_3$ | 5 to 8 |
| $Na_2O$ | 11 to 15 |
| $Al_2O_3$ | 3 to 5 |
| F | 3 to 5 |

3. Glass fibers having substantially the following composition by weight:

| | Per cent |
|---|---|
| $SiO_2$ | 57.8 |
| $TiO_2$ | 7.7 |
| $ZrO_2$ | 3.9 |
| $B_2O_3$ | 7.7 |
| $Na_2O$ | 14.5 |
| $Al_2O_3$ | 4.9 |
| F | 3.5 |

4. As an article of manufacture, glass fibers arranged in a helter-skelter fashion and bonded together at their junctures and consisting by weight of:

| | Per cent |
|---|---|
| $SiO_2$ | 50 to 62 |
| $TiO_2$ | 2.5 to 16 |
| $ZrO_2$ | 1.0 to 16 |
| $B_2O_3$ | 2 to 12 |
| $Na_2O$ | 10 to 20 |
| $Al_2O_3$ | 1 to 10 |
| F | 0.5 to 8 | wherein the sum of the titania and zirconia does not exceed 25%.

5. A glass having the following composition by weight:

| | Per cent |
|---|---|
| $SiO_2$ | 50 to 62 |
| $TiO_2$ | 5 to 25 |
| $B_2O_3$ | 2 to 12 |
| $Na_2O$ | 10 to 20 |
| $Al_2O_3$ | 1 to 10 |
| F | 0.5 to 8 | and having up to 16% zirconia, the sum of the zirconia and titania being not greater than 25%.

RALPH L. TIEDE.
FAY V. TOOLEY.

References Cited in the file of this patent

UNITED STATES PATENTS

| Number | Name | Date |
|---|---|---|
| 1,292,147 | Taylor | Jan. 21, 1919 |
| 1,292,148 | Taylor | Jan. 21, 1919 |
| 1,362,917 | Barton et al. | Dec. 21, 1920 |
| 2,143,022 | McClure | Jan. 10, 1939 |
| 2,388,866 | Partridge | Nov. 13, 1945 |
| 2,433,883 | Armistead | Jan. 6, 1948 |